United States Patent
Fleming et al.

(10) Patent No.: US 11,663,360 B2
(45) Date of Patent: May 30, 2023

(54) DATA CONSENT MANAGER

(71) Applicant: MASTERCARD INTERNATIONAL INCORPORATED, Purchase, NY (US)

(72) Inventors: Adeline-Fleur Fleming, Duxford (GB); Yukiko Lorenzo, London (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 17 days.

(21) Appl. No.: 17/178,994

(22) Filed: Feb. 18, 2021

(65) Prior Publication Data

US 2021/0256163 A1 Aug. 19, 2021

(30) Foreign Application Priority Data

Feb. 18, 2020 (EP) ..................................... 20158106

(51) Int. Cl.
*G06F 21/62* (2013.01)
*G06F 21/60* (2013.01)
*G06Q 30/0201* (2023.01)

(52) U.S. Cl.
CPC ........ *G06F 21/6272* (2013.01); *G06F 21/602* (2013.01); *G06F 21/604* (2013.01); *G06F 21/6245* (2013.01); *G06Q 30/0201* (2013.01)

(58) Field of Classification Search
CPC .. G06F 21/6272; G06F 21/602; G06F 21/604; G06F 21/6245; G06Q 30/0201
See application file for complete search history.

(56) References Cited

U.S. PATENT DOCUMENTS

| | | | |
|---|---|---|---|
| 10,891,689 B2 * | 1/2021 | Pinski | H04L 9/3239 |
| 11,033,768 B2 * | 6/2021 | Chuang | A63B 23/02 |
| 2002/0035485 A1 | 3/2002 | Mita et al. | |
| 2010/0010824 A1 * | 1/2010 | Kim | G06Q 30/02 |
| | | | 705/1.1 |
| 2010/0185656 A1 * | 7/2010 | Pollard | G06F 21/31 |
| | | | 707/769 |

(Continued)

FOREIGN PATENT DOCUMENTS

EP 3447671 2/2019

OTHER PUBLICATIONS

European Patent Office, "The extended European Search report, Application No. EP20158106.3-1218", dated Jul. 17, 2020, 8 pages.

*Primary Examiner* — Phy Anh T Vu
(74) *Attorney, Agent, or Firm* — Pillsbury Winthrop Shaw Pittman LLP

(57) ABSTRACT

A computer implemented method of managing consent for sharing data, the method comprising: storing data sharing preferences for a data subject in relation to data held by a plurality of data controllers; receiving a data share request from a requestor to obtain personal data relating to the data subject and held by one or more of the data controllers; comparing the data share request to the data sharing preferences of the data subject; and for each of the one or more data controllers: instructing the one or more data controllers to share the personal data with the requestor, or rejecting the data share request, in dependence on the comparison.

20 Claims, 13 Drawing Sheets

(56) References Cited

U.S. PATENT DOCUMENTS

| | | | |
|---|---|---|---|
| 2014/0164508 A1* | 6/2014 | Lynch | H04L 67/00 709/204 |
| 2015/0207813 A1* | 7/2015 | Reybok | H04L 63/145 726/22 |
| 2016/0070758 A1* | 3/2016 | Thomson | G16H 10/60 707/781 |
| 2016/0132696 A1 | 5/2016 | Vidhani et al. | |
| 2016/0255082 A1* | 9/2016 | Rathod | H04L 63/10 726/1 |
| 2016/0381013 A1* | 12/2016 | Buscemi | H04L 63/10 726/4 |
| 2019/0348158 A1* | 11/2019 | Livesay | G16H 10/60 |
| 2019/0392162 A1 | 12/2019 | Stern et al. | |
| 2020/0082121 A1* | 3/2020 | Hanafee | G06Q 30/018 |
| 2020/0175206 A1* | 6/2020 | Brannon | G06F 21/6245 |
| 2020/0334370 A1* | 10/2020 | Turgeman | G06F 16/24556 |
| 2021/0165898 A1* | 6/2021 | Weiss | G06F 16/13 |
| 2021/0192082 A1* | 6/2021 | Jones | G06F 21/60 |
| 2022/0050916 A1* | 2/2022 | Mitsunobu | G06F 21/79 |
| 2022/0414255 A1* | 12/2022 | Wang | G06Q 10/10 |

* cited by examiner

| Data requestor | Share data? | |
|---|---|---|
| | Y | N |
| Organisation 1 | | |
| Organisation 2 | | |
| Organisation 3 | | |
| Organisation 4 | | |
| Organisation 5 | | |
| Organisation 6 | | |
| Organisation 7 | | |

FIG. 3

| Data requestor | Share data? | | |
|---|---|---|---|
| | Y | N | Ask me |
| Organisation 1 | | | |
| Organisation 2 | | | |
| Organisation 3 | | | |
| Organisation 4 | | | |
| Organisation 5 | | | |
| Organisation 6 | | | |
| Organisation 7 | | | |

FIG. 4

| Data Requestor and Data Type | Share data? | | |
|---|---|---|---|
| | Y | N | Ask me |
| • Organisation 1<br>   • Data type 1<br>   • Data type 2<br>   • Data type 3 | | | |
| • Organisation 2<br>   • Data type 1<br>   • Data type 2<br>   • Data type 3 | | | |
| • Organisation 3<br>   • Data type 1<br>   • Data type 2<br>   • Data type 3 | | | |
| • Organisation 4<br>   • Data type 1<br>   • Data type 2<br>   • Data type 3 | | | |
| • Organisation 5<br>   • Data type 1<br>   • Data type 2<br>   • Data type 3 | | | |
| • Organisation 6<br>   • Data type 1<br>   • Data type 2<br>   • Data type 3 | | | |
| • Organisation 7<br>   • Data type 1<br>   • Data type 2<br>   • Data type 3 | | | |

FIG. 5

| Data Requestor and Data Type | Share data? | | | | | |
|---|---|---|---|---|---|---|
| | Y | | | | N | Ask me |
| | Use type 1 | Use type 2 | Use type 3 | Use type 4 | | |
| • Organisation 1<br>   • Data type 1<br>   • Data type 2<br>   • Data type 3 | | | | | | |
| • Organisation 2<br>   • Data type 1<br>   • Data type 2<br>   • Data type 3 | | | | | | |
| • Organisation 3<br>   • Data type 1<br>   • Data type 2<br>   • Data type 3 | | | | | | |
| • Organisation 4<br>   • Data type 1<br>   • Data type 2<br>   • Data type 3 | | | | | | |
| • Organisation 5<br>   • Data type 1<br>   • Data type 2<br>   • Data type 3 | | | | | | |
| • Organisation 6<br>   • Data type 1<br>   • Data type 2<br>   • Data type 3 | | | | | | |
| • Organisation 7<br>   • Data type 1<br>   • Data type 2<br>   • Data type 3 | | | | | | |

FIG. 6

KEY

Y or y = yes

N or n = no

A or a = yes, if anonymised/aggregated

? = ask me

| Data Requestor and Data Type | Share data? | | | |
| --- | --- | --- | --- | --- |
| | Research | Marketing | Profiling | Other |
| • Medical research charity | Y | Y | Y | Y |
|   • Contact information | y | y | y | y |
|   • Medical data | y | y | y | y |
|   • Demographic information | y | y | y | y |
| • Political organisation | Y | Y | Y | Y |
|   • Contact information | y | y | y | y |
|   • Medical data | y | y | y | y |
|   • Demographic information | y | y | y | y |
| • Environmental research organisation | Y | Y | Y | Y |
|   • Contact information | y | y | y | y |
|   • Medical data | y | y | y | y |
|   • Demographic information | y | y | y | y |
| • Government organisation | Y | Y | Y | Y |
|   • Contact information | y | y | y | y |
|   • Medical data | y | y | y | y |
|   • Demographic information | y | y | y | y |
| • Financial Data Company | Y | Y | Y | Y |
|   • Contact information | y | y | y | y |
|   • Medical data | y | y | y | y |
|   • Demographic information | y | y | y | y |

FIG. 7A

KEY

Y or y = yes

N or n = no

A or a = yes, if anonymised/aggregated

? = ask me

| Data Requestor and Data Type | Share data? | | | |
|---|---|---|---|---|
| | Research | Marketing | Profiling | Other |
| • Medical research charity<br>　• Contact information<br>　• Medical data<br>　• Demographic information | Y<br>y<br>y<br>y | <br>y<br>a<br>a | A<br>a<br>a<br>a | ?<br>?<br>?<br>? |
| • Political organisation<br>　• Contact information<br>　• Medical data<br>　• Demographic information | N<br>n<br>n<br>n | N<br>n<br>n<br>n | N<br>n<br>n<br>n | N<br>n<br>n<br>n |
| • Environmental research organisation<br>　• Contact information<br>　• Medical data<br>　• Demographic information | <br>n<br>a<br>a | <br>n<br>a<br>a | <br>n<br>a<br>a | ?<br>?<br>?<br>? |
| • Government organisation<br>　• Contact information<br>　• Medical data<br>　• Demographic information | <br>y<br>a<br>a | <br>?<br>?<br>a | A<br>a<br>a<br>a | ?<br>?<br>?<br>? |
| • Financial Data Company<br>　• Contact information<br>　• Medical data<br>　• Demographic information | ?<br>?<br>?<br>? | ?<br>?<br>?<br>? | ?<br>?<br>?<br>? | ?<br>?<br>?<br>? |

FIG. 7B

KEY

Y or y = yes

N or n = no

A or a = yes, if anonymised/aggregated

? = ask me

| Data Requestor and Data Type | Share data? | | | |
|---|---|---|---|---|
| | Research | Marketing | Profiling | Other |
| • Medical research charity | N | N | N | N |
|   • Contact information | n | n | n | n |
|   • Medical data | n | n | n | n |
|   • Demographic information | n | n | n | n |
| • Political organisation | N | N | N | N |
|   • Contact information | n | n | n | n |
|   • Medical data | n | n | n | n |
|   • Demographic information | n | n | n | n |
| • Environmental research organisation | N | N | N | N |
|   • Contact information | n | n | n | n |
|   • Medical data | n | n | n | n |
|   • Demographic information | n | n | n | n |
| • Government organisation | N | N | N | N |
|   • Contact information | n | n | n | n |
|   • Medical data | n | n | n | n |
|   • Demographic information | n | n | n | n |
| • Financial Data Company | N | N | N | N |
|   • Contact information | n | n | n | n |
|   • Medical data | n | n | n | n |
|   • Demographic information | n | n | n | n |

FIG. 7C

| Data Requestor categories | Data Requestor and Data Type | Share data? | | | |
|---|---|---|---|---|---|
| | | Research | Marketing | Profiling | Other |
| Organisation Type 1 | Overall Preference | | | | |
| | • Organisation 1<br>   • Data Type 1<br>   • Data Type 2<br>   • Data Type 3 | | | | |
| | • Organisation 2<br>   • Data Type 1<br>   • Data Type 2<br>   • Data Type 3 | | | | |
| Organisation Type 2 | Overall Preference | | | | |
| | • Organisation 3<br>   • Data Type 1<br>   • Data Type 2<br>   • Data Type 3 | | | | |
| | • Organisation 4<br>   • Data Type 1<br>   • Data Type 2<br>   • Data Type 3 | | | | |
| | • Organisation 5<br>   • Data Type 1<br>   • Data Type 2<br>   • Data Type 3 | | | | |
| Organisation Type 3 | Overall Preference | | | | |
| | • Organisation 6<br>   • Data Type 1<br>   • Data Type 2<br>   • Data Type 3 | | | | |
| | • Organisation 7<br>   • Data Type 1<br>   • Data Type 2<br>   • Data Type 3 | | | | |

FIG. 8

DATA CONSENT MANAGER

RELATED APPLICATIONS

This application claims priority to European Patent Application No. 20158106.3, filed Feb. 18, 2020, which is incorporated herein by reference in its entirety.

TECHNICAL FIELD

The present disclosure relates to a method of managing consent for sharing data, a method of improving security of data sharing, a data consent manager, and a system for managing consent for sharing data.

BACKGROUND

Data privacy is a concern for many individuals and organizations. Legislation has been brought in to many jurisdictions (GDPR in the EU for example) that gives rights to individuals to control access to their own data. Ignoring these new rules can result in adverse consequences for any persons or organizations found to be mishandling data. Mishandling data need not be done maliciously and can arise due to human error or lack of knowledge of the law.

Conversely, access to data (and "big data" in particular) is a powerful tool that can help in numerous technical fields, including medical research and machine learning. The larger a data set the more accurate findings can be, and so access to the data of thousands, or even millions, of individuals is a very powerful, and valuable, resource. Some of the most useful data, such as medical data, is understandably particularly well controlled, and held for millions of individuals by a single organization (such as the NHS in the UK for example). Analysis and correlation of data sets across populations can improve the identification of factors affecting heath issues. This reduces the time taken to develop treatments, potentially saving and improving lives.

Data privacy and control, and the need for an organization to demonstrate compliance with data privacy law is diametrically opposed to sharing personal data for the good of humanity overall.

Various aspects of the disclosure may therefore relate to improved access and control of access to data.

SUMMARY

A first aspect of the disclosure provides a method of managing consent for sharing data. The method comprises: storing data sharing preferences for a data subject in relation to data held by a plurality of data controllers; receiving a data share request from a requestor to obtain personal data relating to the data subject and held by one or more of the data controllers; comparing the data share request to the data sharing preferences of the data subject; and for each of the one or more data controllers: instructing the data controller to share the personal data with the requestor, or rejecting the data share request, depending upon the comparison.

Managing consent for sharing data in this way improves the removal of delays and blocks to the sharing of data that can result in the delay of developing treatments in medical research and in developments in other sectors which benefit from access to "big data".

Fear of being pursued under data protection laws inhibits data controllers from agreeing to share their data. Managing data sharing consent in this way therefore allows data subjects to fulfil their altruistic desire to be helpful to mankind as a whole through the sharing of their data for beneficial purposes. This can be balanced with ensuring privacy in that the data subject can also ensure that data requestors who they do not wish to access the data subject's data can be prevented from doing so.

Data sharing across sectors may also be required by law in some jurisdictions in order to promote competition. The implementation of the above method also provides a robust and reliable way of demonstrating compliance with such regulations, as well as balancing the privacy of the individual with the benefits to the market.

The data share request may comprise at least one of a requestor identification portion, a data share request purpose, and a data type identification portion. The data share request may comprise any two or all three of the requestor identification portion the data share request purpose, and the data type identification portion.

The requestor identification portion allows for defined identification and categorization of the requestor. The requestor identification portion may specifically identify the requestor. Alternatively, or in addition, the requestor identification portion may identify a category or characteristic of organization or group to which the requestor belongs. Incorporating a requestor identification portion improves security over prior art arrangements, as it allows for identification of pre-approved requestors (such as by characteristic, category or group). Efficiency improvements may also be possible, as the identification may categorise the requestor, allowing for swifter comparisons with data subject preferences, and the resulting approval or disapproval of the request using less time and/or computational resources.

The data type identification portion allows for defined identification and categorization of the data that is being requested. The data type identification portion may specifically identify the data type. Alternatively, or in addition, the data type identification portion may identify a classification of data type to which the data type belongs. Incorporating a data type identification portion improves security over prior art arrangements, as it allows for identification of pre-approved data types, and therefore limits access to un-approved data types. Efficiency improvements may also be possible, as the identification may categorise or classify the data type, allowing for swifter comparisons with data subject preferences (and possibly less computationally intensive comparisons), and the resulting approval or disapproval of the request. By data type it is meant categories of personal data (which may overlap). A non-extensive list of examples of categories of data includes: medical data, genetic data, contact information, and financial data (such as credit score). Any other data type may be included. The subject may therefore have preferences that are dependent upon the data type that is being requested and these preferences can be taken into account accordingly.

The providing of a data share request purpose in the data share request may enable the data subject to provide informed consent to data sharing. If the purpose for which the data is to be shared is obscure, this may not be possible. A data subject may decline to share their data unless they approve of the purpose.

The data share preferences may comprise at least one of requestor sharing preferences, data share request purpose preferences and data type sharing preferences.

These different types of data share preferences provide appropriate granularity for a data subject such that they can better control their data sharing preferences or permissions. It allows them to select specific requestors (or types of requestors) they do or do not wish to share data with, purposes of data sharing that they do or do not consent to, as well as types of data that they may be either willing or unwilling to share. The preferences may also be combinable. In other words a data type sharing preference or data purpose preference may be selectable for individual, or groups of requestors (such as based on categorization and/or grouping). Similarly requestor sharing preferences may be selectable for different data type sharing preferences.

The method may further comprise retrieving the data share preferences or permissions.

The data sharing preferences may be stored at a data consent manager that does not store personal data. The data consent manager may be separate from, and external to the data controllers. The separation of the data consent manager from the data controllers may enhance security, since the privacy of a user is protected by the third party data consent manager.

The method may comprise providing the data subject with a user interface for creating initially, and/or editing after creation of, their data sharing preferences in relation to more than one data controller. The user interface may be configured to automatically select data sharing preferences based on criteria that are set by the data subject (for example, as discussed above, based on categories of requestor or data share request purpose). The automatic setting of data sharing preferences may include categorization of one or more of: data controllers; data share request purposes and data types.

The method may further comprise retrieving the data sharing preferences.

Comparing the data share request to data sharing preferences of a data subject may comprise populating a look up table with the data sharing preferences and looking up the data share request in the look up table.

A second aspect of the disclosure provides a computer implemented method of enhancing security of data processing, the method comprising: directing a data share request from a requestor to a data consent manager, the data share request comprising a request for personal data relating to a data subject and held by one or more data controllers; comparing the data share request to data sharing preferences for the data subject, the data sharing preferences relating to a plurality of data controllers; and for each of the one or more data controllers: sending an instruction, from the data consent manager to the data controller, to share the personal data with the requestor or rejecting the data share request in dependence on the comparison.

The method provides improved data security to solutions known in the art. Providing a data subject the ability to centrally record their data share preferences allows the data subject to edit and/or revoke their preferences centrally, rather than seeking to do so for each data controller that they recall may have access to their data. The data share request may comprise at least one of: a data subject identification portion; a data type identification portion; a data share request purpose; and a data requestor identification portion.

The method of the second aspect may include any of the features disclosed with reference to the first aspect.

A third aspect of the disclosure provides a non-transitory machine readable medium comprising computer readable instructions, for configuring a computing system to carry out the method according to the first or second aspect, including the optional features thereof.

A further aspect of the disclosure provides a data consent manager. The data consent manager may comprise a user interface. The user interface may be configured to receive data sharing preferences from a data subject. The data consent manager may comprise a memory. The memory may be configured to record the data sharing preferences. The data consent manager may comprise a request receiving module. The request receiving module may be configured to receive a request for access to data from a requestor. The data consent manager may comprise a comparison module. The comparison module may be configured to compare the request for access to the data sharing preferences and may determine whether the data subject consents to sharing the requested data with each of a plurality of data controllers and may provide an output in dependence on the comparison. The data consent manager may comprise an authorisation module. The authorisation module may be configured to send an authorisation to each data controller to share data with the data requestor in dependence on the output from the comparison module.

A data consent manager provides a single point for a data subject to manage their preferences and consents for the sharing of data pertaining to them. This allows the data subject to more efficiently view and manage their preferences and consents. By manage it is meant that updates and modifications can be made. For example, consents may be modified, added or withdrawn, variations or caveats to consents may be modified, added or withdrawn, and various other modifications made, including at least the examples provided in the description below.

Having a single access point for the data subject improves efficiency for the data subjects as it means that they are no longer required to interact with each data controller individually.

The user interface may comprise a form comprising a plurality of selectable options.

Selectable options provide an error reduction mechanism that helps the data subject to avoid input mistakes in the management of their preferences, and therefore reduce the possibility of human error and accordingly improve security as there is a reduced likelihood of sharing data with an unwanted third party. The error reduction mechanism is provided at least in part via the provision of discreet, easily understandable selections that the data subject can chose. For example, "Yes, I do want to share data" or "No, I do not wish to share data"

The user interface may comprise one or more templates. The templates may be configured to populate the form automatically.

Using pre-populated/automatically pre-populated templates can reduce the time it takes a data subject to create or edit their preferences, and can make it more likely that they will give consent to at least some combination of data requestors, uses for the data, and data types.

The memory may comprise a database populated with data subjects and their respective data sharing preferences.

The data sharing preferences may identify whether consent is provided for each of the data controllers to use the personal data for each of a plurality of purposes.

The comparison module may be configured to determine whether the data subject consents to sharing the requested data with each of the data controllers for one or more purposes specified in the request.

The user interface may be configured to automatically select data sharing preferences based on criteria that are set by the data subject.

The methods may be used in and/or the data consent manager of the disclosure may be used in or form part of respectively, an application or programme installed on a computing device, for example a mobile phone.

The management and sharing of medical telemetric data may be the focus of any such method or application. The medical telemetric data may be heart rate, or blood pressure, or blood sugar monitoring (on-person or in vitro), or urine tests, or sleep monitoring etc.

The data may be kept on the computing device and transmitted to a remote processing station periodically, or it may be fed more live/contemporaneously to a remote processing station.

This data is presently not often shared for Big Data statistical analysis because getting data protection—required permissions, and an audit trail proving it, is cumbersome and time consuming. The use of the above methods or installation of the above data consent manager can therefore enable this analysis, as it makes the process less cumbersome and time consuming and may provide an audit trail, and in particular an independently verifiable audit trail.

The data consent manager may be implemented as part of an app, such as on-phone app, and may specifically ask the user if they want to opt in to their data in to being shared with particular organizations, or classes of organizations, for all purposes or for particular purposes. This means that at the time of setting up their new monitoring device (often a wearable tech device) the user may be asked to opt in to sharing for medical science benefit, and the opting in process is transparent, easy to use, and reversible easily by the user. This means there is a better chance that they will share their data—either raw, anonymised or aggregated). This will over time result in faster and better life-enhancing developments in medical knowledge, and its practical application to apparatus and methods for diagnosis, prognosis or treatment.

The data consent manager may be implemented in a financial app, such as those used in on-line banking, transferring money from device to device, e-wallets etc. When an on-phone app is downloaded to a phone the user may be asked if they consent to share their data with, for example, a cyber security company that intends to monitor their transactions and flag possible fraud to them.

When a user downloads a new app they may be asked if they consent to share data from those apps with an anti-fraud requester. That on-boarding function could be downloaded along with or as part of the app they want to use when they set it up.

Further aspects of the disclosure provide a system, computing system or network comprising the data consent manager of the preceding aspect and may further comprise at least one of a server and at least one computing device.

BRIEF DESCRIPTION OF THE DRAWINGS

A description of the disclosure will now be described, by way of example only, with reference to the accompanying drawings, in which:

FIG. 3 shows a preference recording form;

FIG. 4 shows an alternative preference recording form;

FIG. 5 shows another alternative preference recording form;

FIG. 6 shows yet another alternative preference recording form;

FIG. 7A shows a pre-filled template for another alternative preference recording form;

FIG. 7B shows another pre-filled template for the preference recording form of FIG. 7A;

FIG. 7C shows yet another pre-filled template for the alternative preference recording form of FIGS. 7A and 7B;

FIG. 8 shows yet another alternative preference recording form;

DETAILED DESCRIPTION

Figure 1:
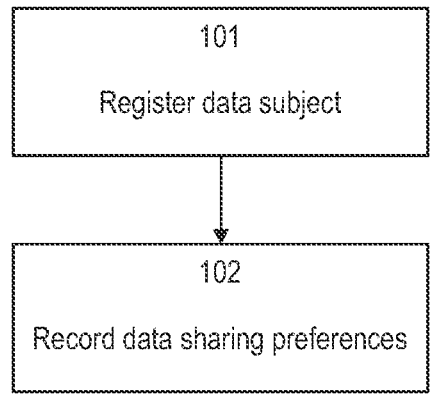
FIG. 1 shows a method of on-boarding a data subject to a data consent manager.

Systems, methods and data consent managers are described below which enable a data subject to have greater control over the sharing and use of their data. The technology also enables a data controller security in handling data requests used in data processing to be able to demonstrate that they have complied with a data subject's requests related to data privacy. A data subject is an individual to whom data pertains. Most (if not all) individuals in the modern world will have some form of data regarding them stored somewhere by a third party. It is often the case that a data subject will not know exactly who has access to their data, what data is stored and what that data may be used for. Whilst a data subject is most likely to be a natural person (and is defined as such in some regulations such as GDPR) in this context it may also apply to a legal person. As such, the pronoun 'their' is used throughout this description and may apply to either the singular or plural and either natural or legal persons. Recent changes in laws, and the introductions of new laws, legislation and regulations, such as GDPR to name but one data privacy law, have been made to try and give data subjects back more control of these factors. Some embodiments of the disclosure may allow a data subject to achieve these rights more reliably and to use them more practicably in the real world.

The systems, methods and data consent managers described below also enable data controllers to greater security over access, authorisation and sharing of data they hold on data subjects. As such a data controller may reduce their risk of inadvertently sharing data with an incorrect party, and also can improve their compliance to local laws and regulations. The term "data controller" means the natural or legal person, public authority, agency or other body which, alone or jointly with others, determines the purposes and means of processing of personal data. Processing, in this context, means any operation or set of operations which is performed on personal data or on sets of personal data, whether or not by automated means, such as collection, recording, organization, structuring, storage, adaptation or alteration, retrieval, consultation, use, disclosure by transmission, dissemination or otherwise making available, alignment or combination, restriction, erasure or destruction. Storage and dissemination, or otherwise making available, are particularly pertinent characteristics to the examples contained in this description.

The systems, methods and data consent managers described below also improve a data requestor's access to permissible sources or repositories of data. In the broadest sense a data requestor is a subset of a data controller, and is defined by their action in requesting access to data. Whilst not initially having access to data, they are looking to collect and utilise it in some way. The data requestor's access to data may be improved over known solutions in that it improves the speed and efficiency of collecting data, simplifies the process of collecting data, and increases the likelihood that the data requestor will be in compliance with any laws and regulations and will not have access to data for which approval has not been given to be shared with them.

An on-boarding process is used to enroll a data subject onto the data consent manager. In this procedure, the data subject accesses the data consent manager for the first time. This may be online, via a downloaded app (application) or program, or via an intermediary in a physical location. The data subject registers as a user. A data consent manager identity is created for them, which may be password protected or similar, to allow access to a user portal of the data consent manager. The data subject is provided an input means by which they can register and set their data sharing preferences. The input means is a graphical user interface of a program or application run on a computer, portable electronic device, or any computing device. Other means of collecting preferences are envisaged. For example, for those who prefer not to use computing devices a simple paper and pen may be provided and the preferences then digitally recorded by a separate individual. The input means comprise a preference recording form.

Preferences may be separated into various subsets:
Preferences on with whom data is shared
Preferences on what data will be used for
Preferences on what sort or type of data is shared
Preferences on how data is shared Various modifiers may also be made to the preferences. For example, a data subject may be happy to share data with a medical charity. Alternatively, they may be happy to share data on the condition that the data is anonymised with medical charities, or even with other organizations, or they may be willing to share data of a particular category if it is aggregated.

The various combinations available for a data subject to select for their preferences could become arduous, and may risk the data subject not completing the form because it is too much trouble. They may decide not to share anything because it takes time and effort to be more granular in their decisions. Pre-filled forms can therefore be provided, in which certain combinations of preferences are selected based on a particular profile. This can reduce the time it takes for a user to populate a data set with their preferences. For example, an 'altruistic' template may be provided, in which consent is provided to share any and all data with charitable organizations or medical treatment or research organizations. Other examples may include a 'maximum privacy' template, in which no consent is provided for the sharing of any data with any organization, or an anonymised and/or aggregate template where data is allowed to be shared but only if anonymised or aggregated, or a free sharing template where data is allowed to be shared with anyone in anyway. Using the templates increases the efficiency of the system and also improves the user experience for the data subject.

In each case the user may be able to use the template as a starting point from which to make further adjustments to their preferences. The templates may be a convenient starting point for setting preferences. That is to say, a user can choose a pre-set template for preferences and then make modifications as desired away from the start point provided by the template.

In some embodiments one of the templates may be set as a default. The default template can be varied within the configuration of the data consent manager in dependence on various factors, such as jurisdiction of use or intended audience. For example, in jurisdictions with strict data privacy rules the 'maximum privacy' template may be the default. In some cases (for example where legal considerations require active "opt-in"), the default template may be to refuse consent to share data with anyone, for any purpose.

In order to inform and prompt the data subject as to their preferences a notification, which may be in the form of an email, push-notification, or a letter, may be sent which notifies the data subject of their current preferences and informs them as to the various options available, possibly along with the advantages and disadvantages for each type. Such a notification may be periodic, or prompted by changes to the preferences. In addition, a data subject may be able to view their preferences after logging in to their own record.

Figure 2:
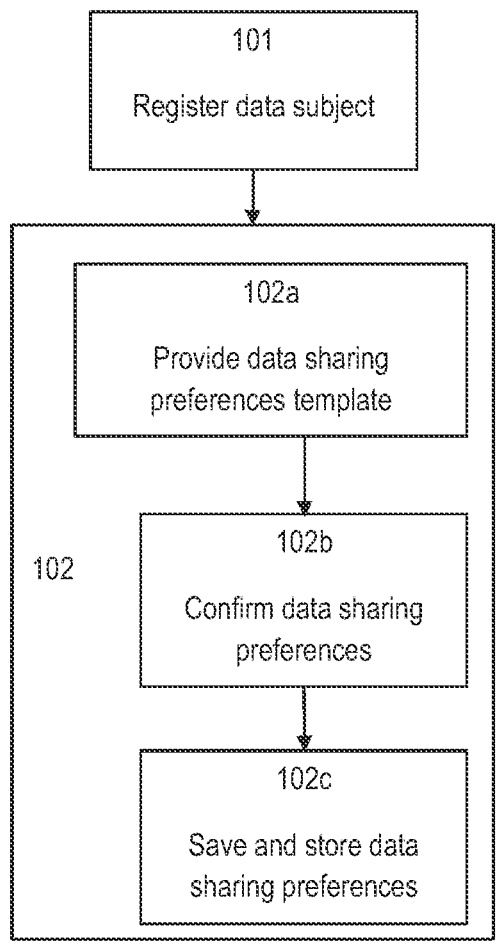
FIG. 2 shows more detailed operations for the method of FIG. 1.

The operations of the method of on-boarding are shown schematically in FIG. 1. Operation 101 comprises registering the data subject. Operation 102 comprises recording the data subject's data sharing preferences. The data subject's preferences are recorded on a preference recording form (such as those discussed below in relation to FIGS. 3-8). FIG. 2 shows additional optional operations comprised within the recording 102 of the data subject's preferences. Operation 102a comprises providing one or more templates to the data subject to pre-populate the preference recording form. Operation 102b comprises confirming the data subject's selections. The confirmation can comprise providing a summary to the data subject and confirming that they are happy with the recording to be saved. Operation 102c comprises saving and storing the data subject's data sharing preferences. The preferences are stored in a secured database located on a server.

Examples of preference recording forms are shown in FIGS. 3-6. The forms link various organizations to data sharing preferences. Whilst each of the forms is set out with reference to individual organizations in some examples categories, types or characteristics of organizations may be listed, with individual organizations grouped within each one. In these examples preferences can be made for the groups of organizations as a whole. If a data subject has particular preferences for a data requestor within a specific group then the data consent manager may provide a "drill down" function, by which the data subject can expand the group into the individual organizations to modify the preferences for each organization independently.

In FIG. 3 the form is set-up to simply ask which organization (i.e. data requestor) the data subject is happy to have their data shared with. The responses are binary with a 'Y' to indicate "yes, my data is allowed to be shared with this organization" and an 'N' to indicate "no, my data is not allowed to be shared with this organization".

In some examples a non-binary option system is provided. FIG. 4 shows one such example, in which an "ask me" column has been added. A selection of "ask me" allows a user greater control and oversight over how exactly a particular organization accesses their data. If a data requestor submits a data share request pertaining to a data subject who has the "as me" option selected for the relevant data requestor, then a notification is sent to the data subject detailing the request. The data subject can then review the request and decide whether to accept or decline the request. The data subject can then respond to the notification with their preference on that occasion and the request either accepted or declined in dependence on the data subject's response. If the data subject does not respond then the request is declined. The time the system waits for a response before assuming no response will be provided may be set at any suitable time limit and may be set in dependence on the nature of the request. Longer time limits are likely to result in more acceptances from data subjects, but may increase the time taken for a full data set, comprising data from multiple data subjects, to be sent to the data requestor. The data requestor may therefore be able to set the time limit in dependence on their preferences and/or use case.

Further granularity is also provided in some examples of the form. FIG. 5 provides one such example. Each organization is broken down into the types of data that may be requested. This enables the data subject to fine tune their preferences for each organization. For example, they may be happy for a financial services provider to have access to their credit score, but not be willing to share their medical data with said organization.

A data type is a category or characteristic of data. These categories may overlap and different pieces of data may fall into multiple categories or have multiple characteristics. A non-extensive list of examples of categories of data includes: medical data, genetic data, contact information, financial data (such as credit score), usage data, and personal preferences (likes and dislikes). Any other data type may be included. The subject may therefore have preferences that are dependent upon the data type that is being requested and these preferences can be taken into account accordingly. Different data controllers are likely to hold and use different data types. A telecoms provider may hold data types such as usage data, contact information, personal preferences and financial data but is unlikely to hold medical data or genetic data.

In this example data type 1 is demographic data. Demographic data may include data pertaining to an individual's age, gender, ethnicity, nationality, disability, economic social class, geographic location or any other data point used in assessing demographics.

In this example data type 2 is medical data. Medical data may include data regarding a data subject's medical history. This may include blood type, whether the data subject currently has any health conditions, whether the data subject smokes, BMI (body mass index), family history of cancer, medication currently being taken, and any other points of data that is used in assessing a data subject's health.

In this example data type 3 is media consumption data. Media consumption data may include data relating to the type of content viewed (such as what genre of film or shows are watched), how long something is watched for, total viewing time, skip or fast forward data, advert response and/or ignore data.

As with the other preferences the data types may also be provided with increasing granularity, with multiple levels of sub-types down to the individual data points. For example, media consumption data may be broken down into data sub-types of television consumption data, radio consumption data, streaming service consumption data ad any other media consumption data. These sub-types may then again be broken down into further sub-types, such as viewing patterns related data (which may include data such as lengths of periods of time which a data subject consumes media and at what times of the day the data subject consumes media) and viewing preferences related data (which may include data such as the types—such as news, sport, films, documentaries, series—and genres of content viewed—such as drama, romance, action, science fiction, crime etc.)

The form provided in FIG. 6 provides another level of granularity, in the form of the intended uses for the data. Each of these levels of granularity may be omitted or combined in dependence on the use case. The forms shown in these figures may therefore be expanded, combined, reduced or modified in any other way.

Certain data requestors and groups of data requestors are unlikely to want to access certain data types. For example, Sky® as a digital TV supply company (amongst other things) is unlikely to want access to health data in that capacity. As such the data consent manager may only present the relevant data types for the selection of preferences for those categories of data requestor. This can allow a reduction in the size of the form and less time taken for the data subject to complete it. The data types that are not deemed relevant may be omitted or be automatically marked with a non-sharing preference. Sky® is more likely to want to access the media consumption data as described above.

This may be highlighted in the form as an area where the data subject may wish to more carefully consider their preferences. Incentives may be provided in order to convince the data subject to be more open with their sharing, such as cheaper or otherwise better tariffs.

The data requestors, as represented by Organizations 1-7 in FIGS. 1-6 and 8 could be any organization or possibly even individuals. In this example Organization 1 is a diabetes monitoring company (such as Dexcom®), Organization 2 is a cancer research charity (such as Cancer Research UK®), Organization 3 is an electricity supply company (such as EDF®), Organization 4 is a water utilities company (such as Severn Trent Water®), Organization 5 is an internet service provider—ISP (such as Plusnet®), Organization 6 is a digital television provider (such as Sky®), and Organization 7 is a streaming service (such as Netflix®).

Organization 1 is likely to want to access data relating to glucose levels in the blood over time, eating habits and medical history. Organization 2 may want family history of cancer, health and lifestyle information (such as whether the data subject is a smoker). Both of these organizations could therefore be categorised as medical research or medical service providers. In FIG. 8 these have been grouped into a single Organization type—Organization Type 1. In other examples they may be separated. As organization 2 is a charitable organization a data subject may prefer to be more open with their data.

Organization 3 is likely to want access data relating to the data subject's home electricity consumption and what their peak usage rates and times are, what their current tariff is, when they last changed their tariff, number of people in household, geographic location, and age of occupants in household for example. Organization 4 is likely to want access to similar data, but with water usage rather than electricity consumption. Organization 5 is likely to want access to average download and upload speeds and/or usage, number of people in household, geographic location, current tariff, and whether they have a mobile phone and what the tariff is on that for example. In FIG. 8 these have been grouped into Organization Type 2. Organization Type 2 may therefore be classified as utility companies.

Both Organization 6 and Organization 7 are likely to want data relating to viewing patterns, viewing preferences, current tariffs, current internet speeds, geographic location, number of people in household, and age of people in household. In FIG. 8 these have been grouped into a single Organization type—Organization Type 3. Organization Type 3 may be classified as media providers.

In some examples Organization Type 2 and Organization Type 3 may be sub-types of a broader Organization Type. In this case the broader organization type may be Service Providers for example.

FIGS. 7A-7C provide examples of forms that have been pre-filled according to various templates. The forms of FIGS. 7A-7C contain similar options as FIG. 6, but are formatted differently to allow various input types. The inputs may be in the form of a drop-down menu from which the data subject can make a pre-validated selection. The options are "Y" or "y" for "yes, data can be shared with this organization for this purpose", "N" or "n" for "no, data cannot be shared with this organization for this purpose", "A" or "a" for "yes, data can be shared with this organization for this purpose but only if anonymised/aggregated", and "?" for "ask me if a request is received from this organization for this purpose".

Where the data subject provides a preference for the organization for a particular use, that preference is then carried across all the data types for that use and that organization. This can be seen in FIG. 7A, in which the medical research charity has been given a "Y" preference for using data in Research, which therefore leads to auto-populating the different data types which may be request by the medical research charity with a "y" preference.

The example template in FIG. 7A provides a template for free sharing. In this case a data subject may be very open and free with their data and therefore selects the free sharing template. All requestors and uses are marked as "Y" and so data is permitted to be shared with any requestor for any use. After selecting the template the data subject can modify their selections, for example they may want to not share data with a specific organization or group of organizations and so could go into the form to modify the selection.

The example template in FIG. 7B provides a template for altruistic sharing. Whilst the data subject does not want open access to all data requestors for all uses, they still wish to support charitable work and medical research. As the data subject may be willing to support research but may still be concerned about their privacy various preference are set such that sharing is allowed, but only on the condition that the data is anonymised/aggregated.

The example template in FIG. 7C provides a template for a data subject who wants to maximise their privacy. All requestors and uses are marked as "N" and so data is not permitted to be shared with any requestor for any use. After selecting the template the data subject can again modify their selections. As not allowing any sharing may provide difficulties in some situations, for example it would prevent open banking, then the user may wish to go in and modify some selections to allow sharing, or perhaps request that the data consent manager sends a notification to ask the data subject for their preference for certain requests.

Various other templates may be provided. The data subject has the overall say in what data is shared, who it is shared with and for what purpose in almost all examples even after the application of a template.

FIG. 8 shows a further input form which groups the data requestors by the type of organization to which they belong. Should a data subject insert a preference into the "Overall Preference" row for a particular organization type then that preference is carried over to all of the organizations and their data types within that group.

Further facilitation can be provided to improve the speed in which a data subject is able to complete the form, particularly in forms having high levels of granularity. Making a selection at a top level (i.e. against the organization itself rather than the data types individually) for a single organization will likewise make the same selection for all of its subheadings. Similarly if a data subject has a preference on sharing (or withholding) a particular data type an option is provided to make a choice which will copy across to all organizations. For example a user can select that they never wish to share their contact data, the form will therefore populate this choice across all organizations. This function may be provided within the form itself, in making groups collapsible and expandable. Alternatively, or as well, multiple pages may be provided within an application or program or application. For example, on the first page the form may be similar to that shown in FIG. 4, but with organization types listed in the left hand most column rather than discrete organizations. Various levels of granularity may then be provided on additional pages should the data subject wish to add more detail, with a form such as that given as example in FIG. 8 allowing for more granularity towards a final page.

Even more granularity may be provided and the compromise between granularity, usability and user fatigue may be adjusted in dependence on preferences and use case.

Data requestors are on-boarded when registering for the first time. A validation process is carried out to check that the data requestor is the organization or individual that they indicate they are. The validation process comprises a validation of a company email address or that the representative of the company completing the on-boarding process possesses sufficient authority. The exact mechanisms of validation will be dependent on the jurisdiction in which data requestor operates. For example, a company making requests form the UK will have a registered company address, executives, and various other verifiable data regarding them. Any of these could be used to validate the request.

The data requestor is provided with a data requestor ID. The data requestor ID is referenced whenever the data requestor makes a request for data as explained in more detail below. The data requestor ID identifies the type of organization that the data requestor is. The data requestor ID also specifically identifies the organization. In some configurations only one of the specific identity or the type of organization is required and so the data requestor ID may only contain one of the two criteria. In some examples the on-boarding of a data requestor comprises the creation of a profile for the data requestor in the data consent manager. The profile may comprise the information described as being linked to the data requestor ID above. The profile may therefore be accessed upon provision of the data requestor ID and a piece of security information, such as a password, by the data requestor.

Data requestors registering with the data consent manager may be requested to provide a designated data depository, to receive data in the event of a successful data share request. The designated data depository may be incorporated into the data requestor's profile and/or ID and is the location (digital and/or physical) to which data is sent. Changing the designated data depository may require a separate authorisation procedure. This may provide an additional security feature in that even were a third party to gain access to the data consent manager account of the data requestor the data is sent to a pre-defined location. The third party would therefore have to force entry into both the data consent manager and the data depository in order to request and retrieve specific data. The provision of a designated data depository therefore provides an additional layer of security against any would be data thieves.

Examples of categories for data requestors include, but are not limited to:
  Medical research institutions
  Medical diagnosis and/or treatment institutions
  Financial technology companies
  Charitable organizations Non-governmental organizations
Government bodies
Political parties/institutions
Academic institutions
Social enterprise organizations.

Figure 9:
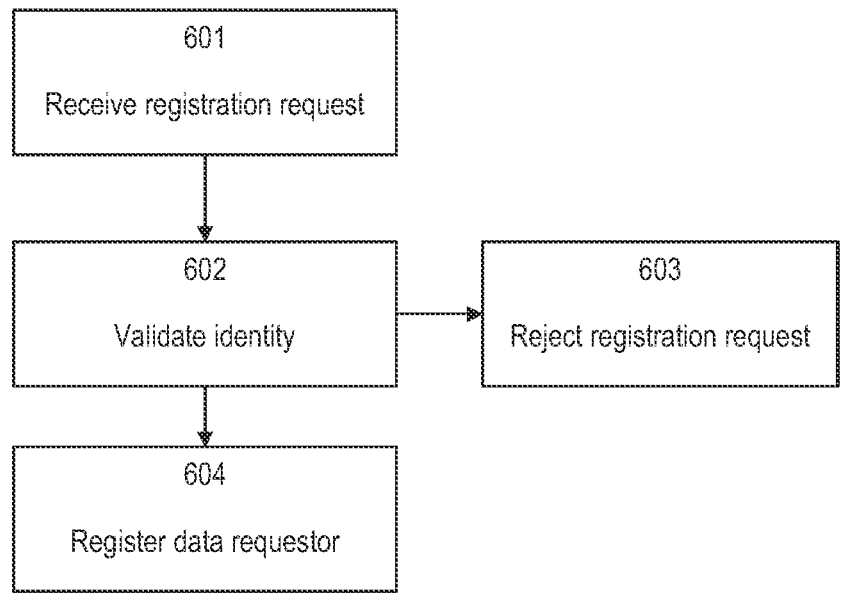
FIG. 9 shows a method of on-boarding a data requestor to a data consent manager.
Figure 10:
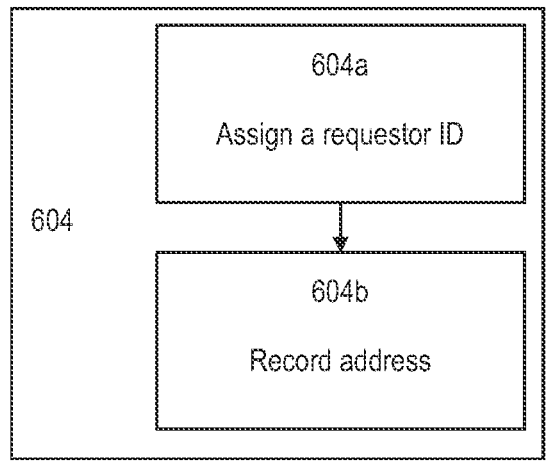
FIG. 10 shows more detailed operations for one of the operations of the method of FIG. 6.

The operations of the method of on-boarding a data requestor are shown in FIG. 9. Operation 601 comprises receiving a registration request from a data requestor. The registration request identifies the data requestor. The registration request also defines the data types to which the data requestor will be requesting access to. Operation 602 comprises validating the identity of the data requestor. Validating the identity of the data requestor may comprise comparing an identifying portion of the request to a certifiable record associated with the data requestor. The validation may also comprise confirming whether the data requestor has a legitimate reason for requesting data. If the validation shows that the request is fraudulent or should the request fail in any way, then the process moves to operation 603, which comprises rejecting the data requestor's registration request. Rejecting the data requestor's registration request may comprise notifying the data requestor of their failed registration attempt. A reason for the failure to register may also be provided in case the failure was due to an error rather than a fraudulent request. If the validation shows that the identity of the data requestor is authentic, then the process moves to Operation 604, which comprises registering the data requestor. FIG. 10 shows additional optional operations comprised within the operation 604 of registering the data requestor. Operation 604a comprises assigning a requestor ID to the data requestor. Operation 604b comprises recording an address of a virtual location belonging to the data requestor, which forms a designated depository at which the data requestor wishes to receive any requested data. The data requestor may provide the address as part of the request at operation 601, or as part of the registration itself at 604.

On-boarding a data controller is a less complex process from the data controller's perspective than on-boarding a data subject or a data requestor, as the data controller's role in the process differs the least from their current role in data management and sharing. The main factor is to ensure that the data that they hold is formatted so as to enable more efficient sharing and transfer of said data. The data consent manager also records and stores a log of the current data subjects and data types that the data controllers are currently holding. This provides a way for the data consent manager to forward or send a data share request to only the pertinent data controllers in dependence on the contents of the data request. On-boarding the data controller therefore comprises registering the data controller with the data consent manager, providing the data format requirements to the data controller and taking a log of which data subjects and which data types are held by the data controller.

In some embodiments, in order that the data consent manager is not required to handle the data itself, the conversion of data to the required standard happens at the data controller, and not the data consent manager. The data consent manager may therefore send a converter module to the data controller for installation on a server of the data controller. This data consent manager may then provide updates to the converter module from time to time should the standards change. This means that the data consent manager never has the data subject data, which reduces the number of transfers of data, thereby improving security. It also removes the requirements that go along with the handling of data, thereby removing the risk of non-compliance from the data consent manager.

In order that data can be effectively and efficiently requested, shared and otherwise managed between all of the parties associated with the data consent manager, system and methods described herein the data may have a formatting standard applied. The formatting standard may be applied across all of the data and requests. The formatting standard may include the digital data format and the required data type headings. In one example the digital data format is Extensible Markup Language (XML); the use of XML has the benefit of having unlimited, and self-definable markup symbols, which can be used to designate the data types. Other digital data formats may be used instead (for example, HTML or SGML) provided the same digital data format is applied consistently across the system or method. In some other examples standard formatting is not used, the data consent manager can comprise a data conversion module that is operable to convert one digital data format into another in order that requests and provisions of data can be processed correctly.

Once on-boarded a data subject is able to access the data consent manager again in order to quickly review and update their preferences or otherwise change their options. In order to do this the data subject first logs in to the data consent manager using their user credentials. The data subject will then be presented with their own portal. The portal provides a summary of the data subject's current preferences and a list of available actions. One of the actions is "modify preferences". Selecting this action takes the data subject to a menu similar (or the same) as the form which they completed during the on-boarding process.

A search function may also be provided. The search function provides an internal search that allows the data subject to search for a specific data requestor, organization, or group/type of organizations or data requestors within their preferences. The search function can also allow a data subject to search by data requestor characteristic or category. This provides a function whereby a data subject can quickly access their preferences for the searched entity, allowing for efficient updating. A data subject may want to update their preferences for just one, or a select few, or for all, data requestors, the search function enables this quick, efficient access. For example, the data subject may wish to check their preferences for sharing their data types with political entities. The data subject could therefore enter a search term such as "politic" (the exact configuration of the search function may make use of wild cards and/or may be presented as an auto-complete field and/or may provide suggested files should the search term not match any held terms) which would then return all the preferences for sharing data with data requestors who fit a political description. The data subject can then check their preferences and, if they have changed their mind from their initial on-boarding, update their preferences if required.

Once in the preference setting portion of the data consent manager the data subject can modify their preferences as they wish. Guidance is provided so as to explain to the data subject what certain settings mean. The templates are also selectable should the data subject wish to quickly bulk update their preferences.

When a new data requestor is on-boarded a notification may be provided to the data subject informing them that an update to their preferences may be required. The notifications may be an adjustable preference. If the data subject wishes to immediately know if a new data requestor has been added they can select immediate notification. Many users may prefer fewer notifications; as such they can set a preference to be notified at specific intervals. These intervals may be, daily, weekly, monthly, or any other suitable interval. Where an interval is set notifications are collated into a single report, which is then sent to the data subject at the specified interval. The data subject may as well, or instead, set pre-agreed/pre-set preferences that automatically generate a set of preferences in dependence on the data requestor's category or characteristics. In this way, should a new data requestor be added in the future then the data subject needn't be necessarily subject to an increased number of notifications as their preferences will automatically be set.

The default settings for any newly on-boarded data requestor may be set at the most strict level. In other words, no data of any type is given permission to be shared. The notification provided to the data subject then informs them of the new data requestor and the current settings and asks the data subject whether they wish to modify these settings. In some examples the data subject may have set their preferences such that certain types of data requestors are permitted to access certain types of the data subject's data, optionally only under certain conditions. In these cases, if the data requestor is validated as being such a type then permissions may be automatically granted based on the data subject's overriding preferences for that type of data requestor without requiring a notification or approval by the data requestor. For example, the data subject may have set their preferences as to allow medical research organizations to access the data subject's medical data on the condition that it is aggregated or anonymised. As such, should a new data requestor be on-boarded that falls into this category, then they will be automatically be permitted to access the data subject's anonymised or aggregated medical data. Similarly, if a type of data requestor has been marked as never being allowed to access the data subject's data then those settings can be applied without requesting confirmation from the data subject. For example a data subject may set their preferences such that political organizations are not permitted to access any of their data. Should a new data requestor be on-boarded that fits into the category, or has the characteristics of, a political party or organization, then all data will be automatically be blocked from their access.

The data consent manager may also provide the data subject with the ability to view and review who currently has access to their data, who is currently storing their data and what data is currently being held. A reporting function may be built into the data consent manager that is configured to generate reports in dependence on a data subject's request.

The data consent manager may be configured to report some or all of the data currently being held on them at the request of the data subject. This may be from some (such as more than one) or all of the data controllers currently storing the data subject's data. This is much more efficient than current implementations, which require individual requests to be made to each of the data controllers with a specific request to access the data.

The data consent manager may also enable a data subject to more efficiently transfer or port their data from one data controller to another, since it may enable a full report of all personal data from a subject to readily be produced. In current systems and networks the data subject is required to be able to remember or have logged themselves which data controllers have access to what data. Whilst some systems, such as open banking, have facilitated easier transfer of a data subject's data between data controllers, it still requires active searching and listing by the data subject as well as being limited to sharing within one industry sector. The data consent manager therefore allows the data subject to view and transfer their data as they see fit. For example, should they move house and need to register with a new council, utilities provider, doctor, or anything else, they could simply use the data consent manager to move their data from the current data controllers to the new ones. They could also optionally request the deletion of their data from the original data controllers at the same point. The data consent manager enables these transfers whilst maintaining and improving data security and the efficiencies of the transfers.

Managing the consent of sharing and access to data in the above ways also provides anti-cybercrime and anti-fraud improvements over systems of the prior art. The on-boarding process for the data requestors already provides defence as described above. The data consent manager also provides approved data requestors the ability to request data that may verify whether a data subject's actions are valid, or whether they may be being subject for fraud. For example, should a payment be made for prescription medication that is not within the normal spending behaviours of a data subject, this may cause an alert in a payment provider's systems that the payment may be fraudulent. If an approved data requestor, the payment provider could query the data consent manager as to the medical status of the data subject. Should the medical status show that the bought medication is valid then no fraud alert would be raised. However, should no data exists then a fraud alert may be raised and the data subject contacted for confirmation or payment withheld.

Figure 11:
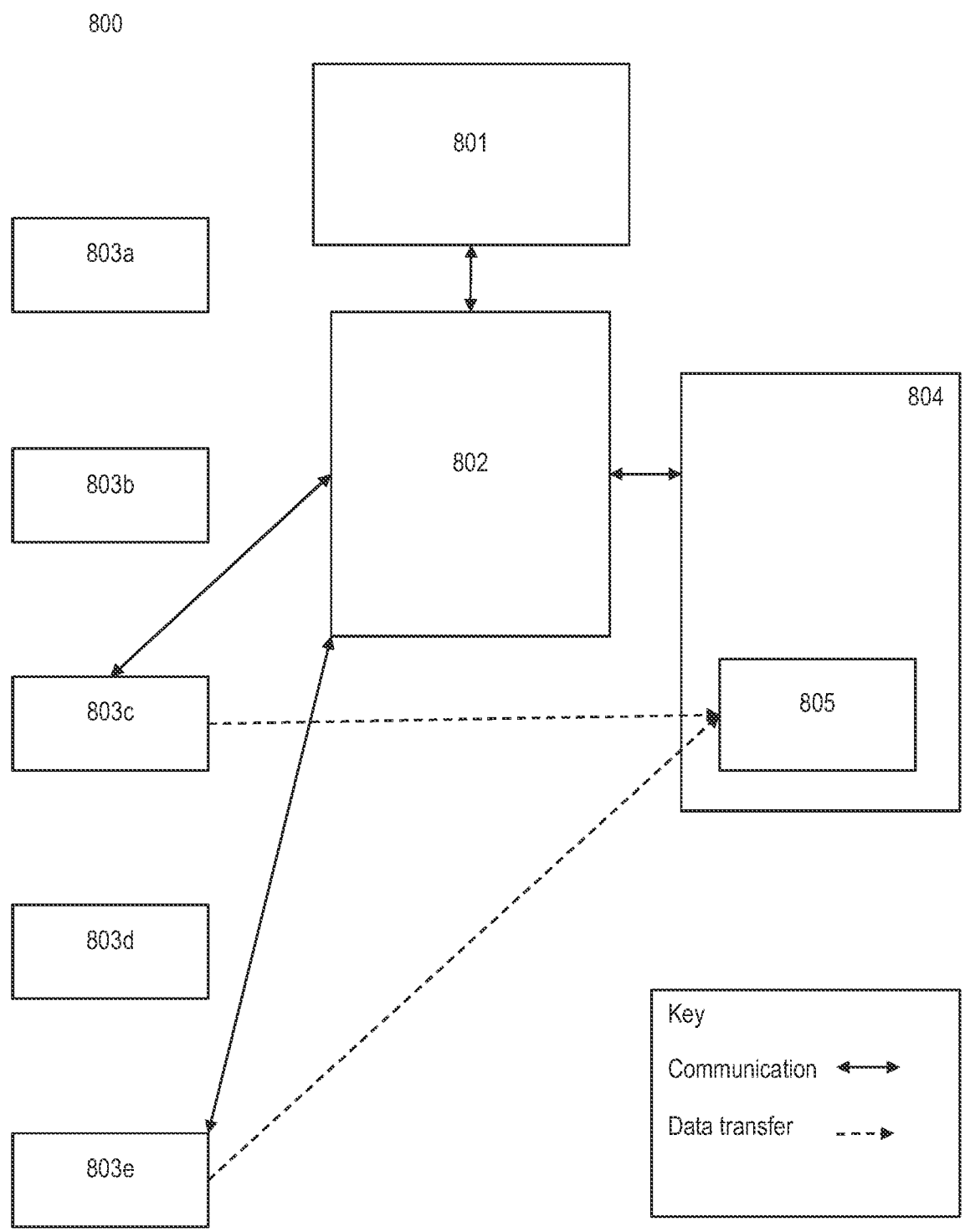
FIG. 11 shows a schematic view of a data sharing system.

A system 800 embodying a data consent manager is represented in the schematic provided in FIG. 11. The system comprises a data subject 801, the data consent manager 802, data controllers 803*a*, 803*b*, 803*c*, 803*d*, 803*e* and a data requestors 804. The data consent manager 802 is configured to communicate with each of the data subject 801, data controllers 803*a*, 803*b*, 803*c*, 803*d*, 803*e* and data requestor 804. The data consent manager 802 is configured to communicate with a selection 803*c*, 803*e* of the data controllers 803*a*, 803*b*, 803*c*, 803*d*, 803*e* in dependence on a request received from the data requestor 804 and preferences received from the data subject 801. The data requestor 804 comprises, or has access to, a data depository 805, at which the data controllers 803*c*, 803*e* may communicate data to in dependence on a request received from the data consent manager 802. The data consent manager 802 can be in communication with any number of data subjects, data requestors and data controllers. The system 800 provides a simplified example with the communication paths based on a particular request. The requested data is sent directly from the data controllers to the data requestor and, in this example, does not get routed via the data consent manager. This reduces the number of transfers, thereby reducing the risk of intrusion and data theft, as well as allowing for a simplified data consent manager that does not need to be burdened with large amounts of transient storage and compliance with personal data laws.

Figure 12:
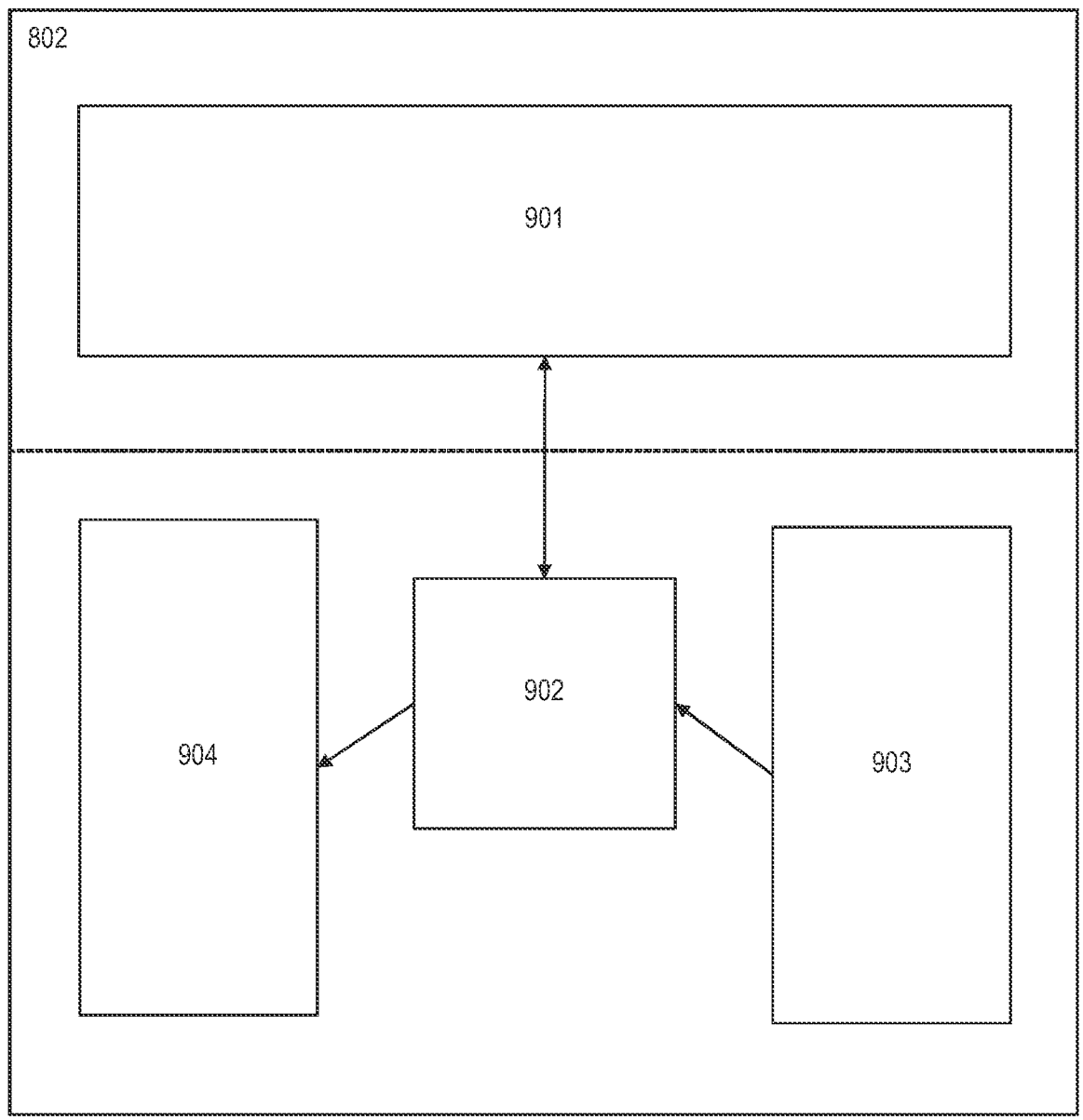
FIG. 12 shows a block diagram representation of a data consent manager.

An example data consent manager 802 will now be described with reference to FIG. 12. The data consent manager is operable to access a storage device 901 and receive and send inputs and outputs respectively. The storage device 901 is comprised within the data consent manager. Alternatively the storage device 901 may be accessed by the data consent manager and be comprised within an external server. The data consent manager 802 stores profiles for each data subject 801 in the storage device 901. The profiles comprise a list, database or other information array, that details the data subject's data sharing preferences. The data consent manager 802 further comprises a comparison module 902. The comparison module 902 comprises a look-up table. The look-up table is configured to be populated with the data sharing preferences stored in the storage device 901. The data consent manager 802 further comprises a request receiving module 903. The request receiving module is configured to receive a data share request from a data requestor 804 and forward the request to the comparison module 902. The data consent manager 802 further comprises an authorisation module 904. The authorisation module 904 is configured to receive a command from the comparison module 902 in dependence on a comparison, made within the comparison module 902, of the data share request form the data requestor 804 to the preferences of the data subject 801.

Figure 13:
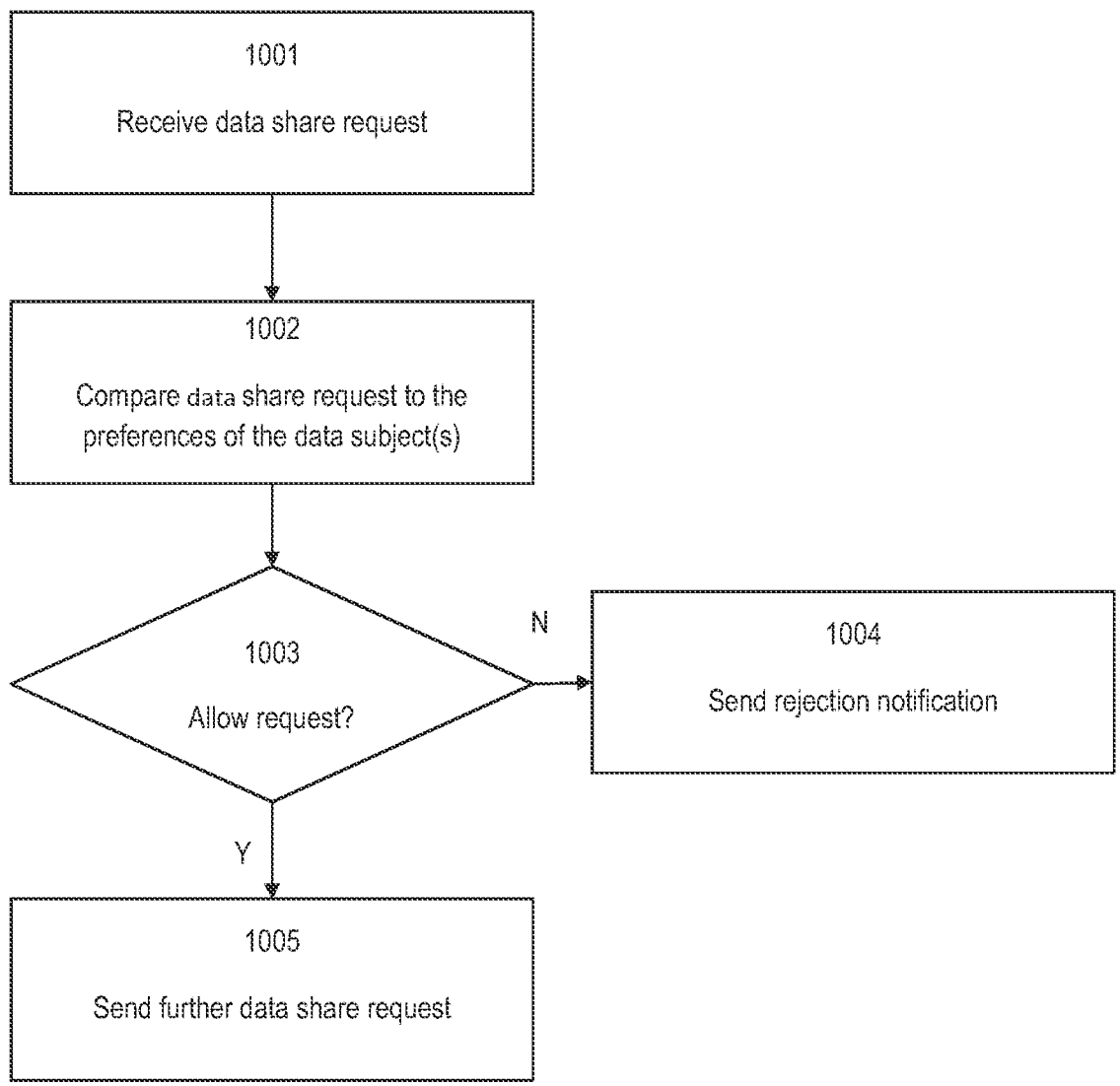
FIG. 13 shows a method of managing data sharing.

An example method of a data requestor requesting access to data will now be described by reference to the method flow diagram shown in FIG. 13.

The data requestor 804 issues a data share request which is received by the data consent manager at operation 1001. In this example the data requestor is a medical research organization and the request relates to health data for a specific demographic. Issuing the data share request comprises the data requestor 804 logging in to the data consent manager 802 using the credentials the data requestor was provided during on-boarding.

The data consent manager 802 receives and/or records the request via the request receiving module 903. A data requestor portal may be provided to the data requestor 804 by the data consent manager which acts as an input means by which the data requestor can create their request. The data requestor then selects the type or types of data to which they want access. In this example it is health data, and in particular history of cancer diagnoses. The data requestor also indicates the data subjects whose data they wish to have access to. The individuals may be selected by criteria, groupings or individually selected. In this example the individuals are selected by category, the category being individuals who are female, between 30 and 40, and smoke. Alternatively the data subjects can be automatically selected in dependence on the data types that is being requested (for example medical data and demographic data). Whilst the data consent manager does not store the data itself, it does store (or at least has access to) the information about what data is stored for each data subject, and whether they are happy for it to be shared.

The data requestor can also optionally select the specific data controllers it wishes to request data from. However, as in this example, this is not essential, as the data consent manager may instead determine where to send the requests based on the data types being requested or the data subjects of interest. In some examples the justification for the data share request may be provided. The justification will indicate the intended use for the data, which is a settable preference of the data subject in some (or many) examples.

At operation 1002 the data consent manager compares the data share request to the preferences of the data subject(s) 801. The input data share request is sent to the comparison module 902 of the data consent manager 802. The comparison module 902 compares the preferences of the data subject(s) 801 to the data request. The comparison module uses a look-up table to identify the data subjects who consent to sharing data for the specific request being made by the data requestor. The data consent manager then selects and records all of the data subject IDs that have their preferences set to allow sharing of the requested data type with the data requestor 804.

At operation 1003 the comparison module determines whether to proceed with the process or reject the request in dependence on the comparison. If the comparison results in a complete rejection then the process moves to operation 1004. A complete rejection occurs if no data subjects consent to the request. At operation 1004 a notification is provided to the data requestor informing them of the rejection. In some examples the comparison needn't result in a complete rejection in order for the process to move to operation 1004. Instead, if a large proportion of the requested data subjects do not give consent, or if the population is small enough such that the individual data subjects may be identifiable based on the requested data, then the rejection may also be given to the data requestor. A large proportion may be greater than 75%. The exact factor than constitutes large is variable in dependence on the total population of relevant data subjects. For example, a request that pertains to medical data for all females living in the UK could result in a rejection of 95%, this would still give approximately more than 1.5 million data sets (based on 2011 UK census), which would provide a lot of data for the requestor whilst still preserving anonymity if that was a factor in the data subjects' preferences.

If, at operation 1003, the comparison module determines that the request is permissible then the process moves to operation 1005. At operation 1005 the data consent manager sends a further data share request to the relevant data controllers 803*c*, 803*e*. This further data share request contains a listing of the data that is being requested and for which data subjects it is being requested for and the designated address of the data requestor to which the data is to be sent. The relevant data controllers 803*c*, 803*e* are determined to be relevant in dependence on whether they hold the data types on the data subjects to which the request from the data requestor pertains. The data consent manager creates a data share request to the relevant data controller(s) in dependence on the output from the comparison module. The data share request comprises a packaged request, separated into several portions. A first portion is a data subject identification portion. The data subject identification portion identifies the data subjects(s) selected by the comparison module as allowing the requested sharing. A second portion is a data type identification portion. The data type identification portion identifies the data types requested by the data requestor. A third portion is a data requestor identification portion. The data requestor identification portion identifies the data requestor and identifies the designated data depository at which the data requestor receives their requested data. Further portions can also be provided in dependence on the complexity of the request or preferences and the specific configuration of the data consent manager.

The data share request is sent via the authorisation module 904 of the data consent manager. The authorisation module 904 sends the data share request to the data controller(s) indicated as being relevant by the data consent manager.

In some examples the data share request may be a complex data share request. A complex data share request comprises multiple data share requests from a single data requestor. In other words, a data requestor may submit a single request which comprises requests for different data types and/or uses for the data. For example, the data requestor may be a medical research organization wishing to access medical data for the purposes of research, but also wishing to assess which data subjects may be willing to be contacted for the purpose of funding requests. These requests may results in different groups of data subjects who match the criteria and different data controllers who hold the relevant data. This approach provides reduced workload and improved efficiency for the data requestor, who need only access the data consent manager once to fulfil multiple requests, rather than having to complete multiple sessions.

Figure 14:
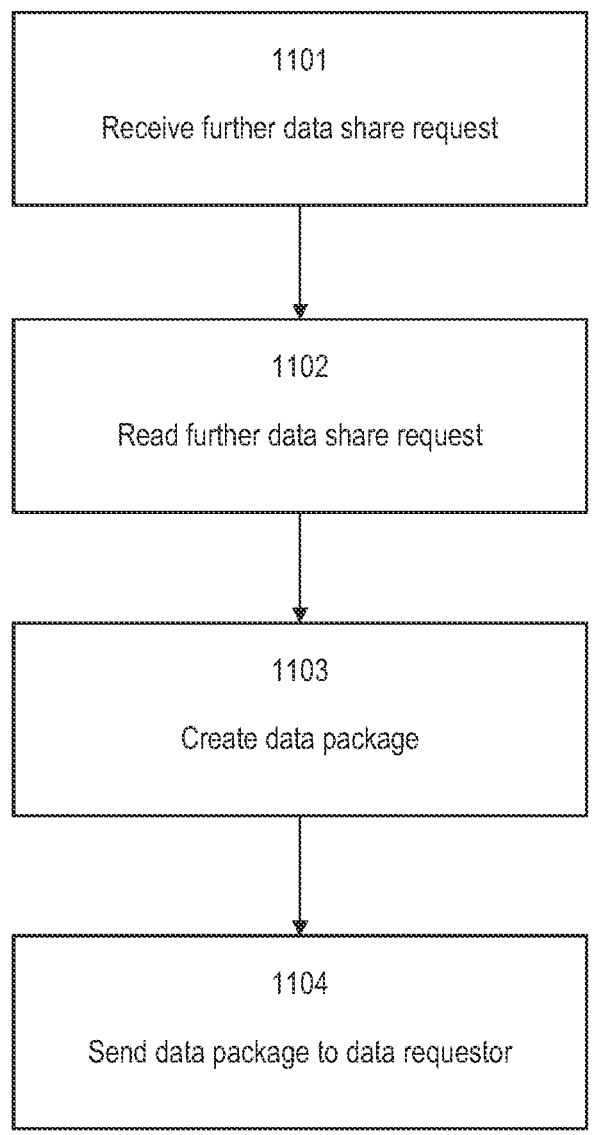
FIG. 14 shows a method for processing a data share request.

An example method of a data controller processing a data share request will now be described by reference to the method flow diagram shown in FIG. 14.

The data controller receives the further data share request from the data consent manager at operation 1101. Upon receiving the data share request the data controller unpackages and reads the request at operation 1102. At operation 1103 the data controller creates a data package for sending to the data requestor. The data controller looks up the relevant data subjects and data types indicated in the respective portions of the request. The data package comprises the looked up data in the form of a separate, new database for sending. Once created the data package is then sent by the data controller to the data requestor at operation 1104. The data package is sent directly to the data requestor's designated depository. The data package may be password protected, or otherwise have security applied to it, such that only the correct verified data requestor or the sending data controller can access the contents. End to end encryption is used such that, even if intercepted, the contents of the data package cannot be read by anyone but the sender and the intended recipient.

The methods described above provide increased safety of data and data subject privacy by making it easier to manage permissions for access to data. This results in fewer accidental mistakes when compared to the human-error prone systems and methods of the prior art.

In some examples the data controller and/or the data requestor send confirmatory receipts to the data consent manager. The data consent manager records the receipt and is configured to generate report for the data subject such they can monitor who is accessing their data.

In some examples the data consent manager has access to the data subject's data and is operable to perform the selection and send a request to the identified relevant data controller(s) for the data for just those selected.

In other examples the data consent manager does not have access to this data, only the preferences, and as such sends a blanket request requesting data for all of the data subjects who consent to sharing the data type with the data requestor type.

In some examples the data subject may be incentivised to increase the sharing permitted by their preferences. There may be a link between the type of data they share and the type of reward made. For example, sharing data relating to driving habits may be used to provide lower insurance premiums or sharing credit history in order to receive better loan or credit card interest rates. Other, non-explicitly related rewards may also be used; for example, the provision of air miles as a reward for sharing medical history.

The data, requests, identities and any other information that is used within the method, system, or data consent manager itself may be encrypted. This is preferable to end to end encryption.

One area where the disclosure has application is that of medical telemetric data—such as heart rate, or blood pressure, or blood sugar monitoring (on-person or in vitro), or urine tests, or sleep monitoring etc. There are many medical Apps (such as mobile phone bases apps) now that gather biometric data from a person and use it to help diagnose or monitor medical conditions/well-being. The data may be kept on device and transmitted to a remote processing station periodically, or it may be fed more live/contemporaneously to a remote processing station. At present this data is not often shared for Big Data statistical analysis because getting data protection—required permissions, and an audit trail proving it, is cumbersome and time consuming. The present disclosure could be used as part of the app, such as on-phone app, and could specifically ask the user if they want to opt their data in to being shared with particular organizations, or classes of organizations, for all purposes or for particular purposes. This means that at the time of setting up their new monitoring device (often a wearable tech device) the user is asked to opt in to sharing for medical science benefit, and the opting in process is transparent, easy to use, and reversible easily by the user. This means there is a better chance that they will share their data—either raw, anonymised or aggregated). This will over time result in faster and better life-enhancing developments in medical knowledge, and its practical application to apparatus and methods for diagnosis, prognosis or treatment.

Another class of apps that the disclosure is envisaged being used in is financial apps, such as those used in on-line banking, transferring money from device to device, e-wallets etc. When an on-phone app is downloaded to a phone the user may be asked if they consent to share their data with, for example, a cyber security company that intends to monitor their transactions and flag possible fraud to them. So when they download Uber® or Lyft® (purely examples) they could be asked if they consent to share data from those Apps with an anti-fraud requester. That on-boarding function could be downloaded along with or as part of the app they want to use when they set it up.

Various modifications can be made to the examples described above without departing from the scope of the appended claims. Features of the examples and embodiments may be exchanged, combined, omitted or adapted. The teaching of the specification should be taken as a whole with no limitation placed on scope of the appended claims by reference to the included description and drawings.

The invention claimed is:

1. A computer implemented method of managing consent for sharing data, the method comprising:
   storing data sharing preferences for a data subject in relation to data of the data subject, the data of the data subject comprising personal data and held by one or more of a plurality of data controllers, the data sharing preferences comprising:
   requestor type sharing preferences comprising:
       a first organization categorized under a first organization type;
       a second organization categorized under a second organization type;
       a first organization type data sharing preference indicating a preference of whether to share the data of the data subject with the first organization type; and
       a second organization type data sharing preference indicating a preference of whether to share the data of the data subject with the second organization type;
       a list of data share request purpose preferences comprising two or more reasons for sharing the data of the data subject to each of the first organization and the second organization, and a respective indication of consent over whether the data subject has consented to sharing the data for each of the two or more reasons, each of the two or more reasons in the list of data share request purpose preferences being distinct from the requestor type sharing preferences; and
       a data type sharing preference indicating a type of data that the data subject has consented to share, the data type sharing preference being distinct from both of the two or more reasons in the list of data share request purpose preferences and the requestor type sharing preferences;

receiving a data share request from a requestor to obtain the personal data relating to the data subject and held by the one or more of the plurality of the data controllers, the data share request comprising:

a requestor identification portion comprising a type of organization the requestor is categorized into:

a data share request purpose representing a stated purpose for why the requestor has requested the personal data, the data share request purpose being distinct from the requestor identification portion; and a data type identification portion representing a type of data that the requestor has requested, the data type identification portion being distinct from both the data share request purpose and the requestor identification portion;

comparing the data share request to the data sharing preferences of the data subject by:

comparing the type of organization in the requestor identification portion to at least one of the first organization type data sharing preference and the second organization type data sharing preference;

comparing the data share request purpose with indications of consent to sharing the data for each of the two or more reasons in the list of data share request purpose preferences; and comparing the data type identification portion to the data type sharing preference; and for each of the one or more of the plurality of data controllers:

instructing the one or more of the plurality of data controllers to share the personal data with the requestor, or rejecting the data share request, in dependence on the comparison of the data share request to the data sharing preferences.

2. The method according to claim 1, wherein the data sharing preferences are stored at a data consent manager that does not store the personal data.

3. The method according to claim 2, wherein the data consent manager is independent and external to the one or more of the plurality of data controllers.

4. The method according to claim 1, further comprising providing the data subject with a user interface for editing the data sharing preferences in relation to the one or more of the plurality of data controller.

5. The method of claim 4, wherein the user interface automatically selects a data sharing preference among the data sharing preferences based on criteria that are set by the data subject.

6. The method of claim 5, wherein automatically selecting of the data sharing preference among the data sharing preferences includes categorization of at least one of: data controllers; data share request purposes; or data types.

7. The method of claim 1, further comprising removing one or more of the two or more reasons from the list of data share request purpose preferences for the first organization categorized under the first organization type, based on the type of data that the first organization requests, such that no indication of consent is selectable by the data subject for the one or more reasons that are removed.

8. The method of claim 1, wherein to instruct the one or more of the plurality of data controllers to share the personal data with the requestor, the method further comprises:

accessing a data depository that is accessible to the requestor, but is not controlled by the requestor and the data depository has a separate authorization procedure from how to access data controlled by the requestor; and transmitting the shared personal data to the data depository.

9. A non-transitory computer readable medium storing instructions that, when executed by a processor of a computing system, cause the computer system to:

store data sharing preferences for a data subject in relation to data of the data subject, the data of the data subject comprising personal data and held by one of more of a plurality of data controllers, the data sharing preferences comprising:

requestor type sharing preferences comprising:

a first organization categorized under a first organization type;

a second organization categorized under a second organization type;

a first organization type data sharing preference indicating a preference of whether to share the data of the data subject with the first organization type; and a second organization type data sharing preference indicating a preference of whether to share the data of the data subject with the second organization type;

a list of data share request purpose preferences comprising two or more reasons for sharing the data of the data subject to each of the first organization and the second organization, and a respective indication of consent over whether the data subject has consented to sharing the data for each of the two or more reasons, each of the two or more reasons in the list of data share request purpose preferences being distinct from the requestor type sharing preferences; and a data type sharing preference indicating a type of data that the data subject has consented to share, the data type sharing preference being distinct from both of the two or more reasons in the list of data share request purpose preferences and the requestor type sharing preferences;

receiving a data share request from a requestor to obtain the personal data relating to the data subject and held by the one or more of the plurality of the data controllers, the data share request comprising:

a requestor identification portion comprising a type of organization the requestor is categorized into:

a data share request purpose representing a stated purpose for why the requestor has requested the personal data, the data share request purpose being distinct from the requestor identification portion; and a data type identification portion representing a type of data that the requestor has requested, the data type identification portion being distinct from both the data share request purpose and the requestor identification portion;

comparing the data share request to the data sharing preferences of the data subject by:

comparing the type of organization in the requestor identification portion to at least one of the first organization type data sharing preference and the second organization type data sharing preference;

comparing the data share request purpose with indications of consent to sharing the data for each of the two or more reasons in the list of data share request purpose preferences; and comparing the data type identification portion to the data type sharing preference; and for each of the one or more of the plurality of data controllers:
instructing the one or more of the plurality of data controllers to share the personal data with the requestor, or rejecting the data share request, in dependence on the comparison of the data share request to the data sharing preferences.

10. The non-transitory computer readable medium of claim 9, wherein the data sharing preferences are stored at a data consent manager that does not store the personal data.

11. The non-transitory computer readable medium of claim 9, wherein the instructions further cause the processor to remove one or more of the two or more reasons from the list of data share request purpose preferences for the first organization categorized under the first organization type, based on the type of data that the first organization requests, such that no indication of consent is selectable by the data subject for the one or more reasons that are removed.

12. The non-transitory computer readable medium of claim 9, wherein to instruct the one or more data controllers to share the personal data with the requestor, the instructions further cause the processor to:
access a data depository that is accessible to the requestor, but is not controlled by the requestor and the data depository has a separate authorization procedure from how to access data controlled by the requestor; and
transmit the shared personal data to the data depository.

13. A data consent manager comprising:
a user interface that is to receive data sharing preferences from a data subject, the data sharing preferences comprising:
requestor type sharing preferences comprising:
a first organization categorized under a first organization type;
a second organization categorized under a second organization type;
a first organization type data sharing preference indicating a preference of whether to share data of the data subject with the first organization type; and
a second organization type data sharing preference indicating a preference of whether to share the data of the data subject with the second organization type;
a list of data share request purpose preferences comprising two or more reasons for sharing the data of the data subject to each of the first organization and the second organization, and a respective indication of consent over whether the data subject has consented to sharing the data for each of the two or more reasons, each of the two or more reasons in the list of data share request purpose preferences being distinct from the requestor type sharing preferences; and
a data type sharing preference indicating a type of data that the data subject has consented to share, the data type sharing preference being distinct from both of the two or more reasons in the list of data share request purpose preferences and the requestor type sharing preferences;
a memory that is to store the data sharing preferences;
a processor programmed to:
receive a request from a requestor to access personal data of the data subject, the request comprising:
a requestor identification portion comprising a type of organization the requestor is categorized into;
a data share request purpose representing a stated purpose for why the requestor has requested the personal data of the data subject, the data share request purpose being distinct from the requestor identification portion; and
a data type identification portion representing a type of data that the requestor has requested, the data type identification portion being distinct from both the data share request purpose and the requestor identification portion;
compare the request for access to the personal data by:
comparing the type of organization in the requestor identification portion to at least one of the first organization type data sharing preference and the second organization type data sharing preference;
comparing the data share request purpose with indications of consent to sharing the data for each of the two or more reasons in the list of data share request purpose preferences; and
comparing the data type identification portion to the data type sharing preference; and
determine whether the data subject consents to sharing the personal data requested with the requestor;
provide an output in dependence on the comparison of the request for access to personal data to the data sharing preferences; and
send, or not send, an authorization to at least one of a plurality of data controllers to share the personal data of the data subject with the requestor based on the comparison.

14. The data consent manager of claim 13, wherein the data sharing preferences identify whether consent is provided for the requestor to use the personal data requested for each of a plurality of data share request purposes.

15. The data consent manager of claim 13, wherein the processor is further programmed to:
determine whether the data subject consents to sharing the personal data requested with the requestor for one or more of data share request purposes specified in the request.

16. The data consent manager of claim 13, wherein the user interface automatically selects a data sharing preference among the data sharing preferences based on criteria that are set by the data subject.

17. The data consent manager of claim 13, wherein the data sharing preferences are stored at a data consent manager that does not store the personal data.

18. The data consent manager of claim 17, wherein the data consent manager is independent and external to the plurality of data controllers.

19. The data consent manager of claim 13, wherein the processor is further programmed to remove one or more of the two or more reasons from the list of data share request purpose preferences for the first organization categorized under the first organization type, based on the type of data that the first organization requests, such that no indication of consent is selectable by the data subject for the one or more reasons that are removed.

20. The data consent manager of claim 13, wherein to send the authorization to at least one of the plurality of data controllers to share data with the requestor based on the comparison, the processor is further programmed to:
access a data depository that is accessible to the requestor, but is not controlled by the requestor and the data depository has a separate authorization procedure from how to access data controlled by the requestor; and
transmit the shared personal data to the data depository.

* * * * *